Nov. 17, 1953    L. C. MURDOCK    2,659,837
SWEEP LINEARITY CONTROL CIRCUIT
Filed March 29, 1949    2 Sheets-Sheet 1
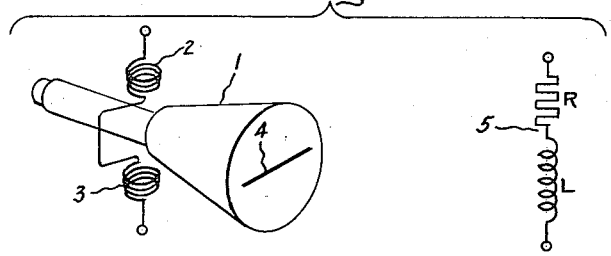
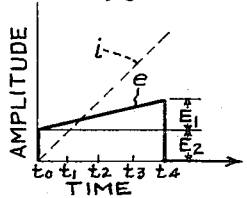
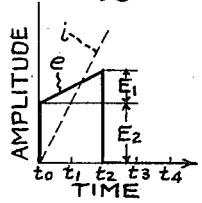
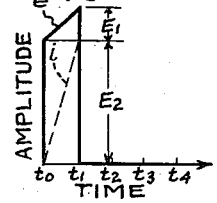
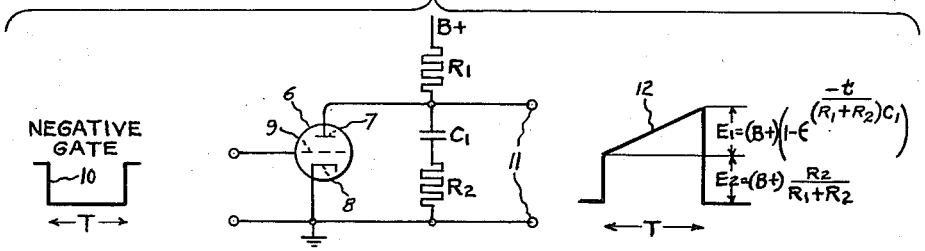
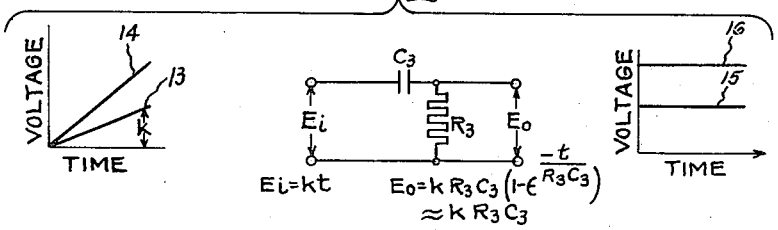
Inventor:
Lawrence C. Murdock,
by *Merton O Mo...*
His Attorney.

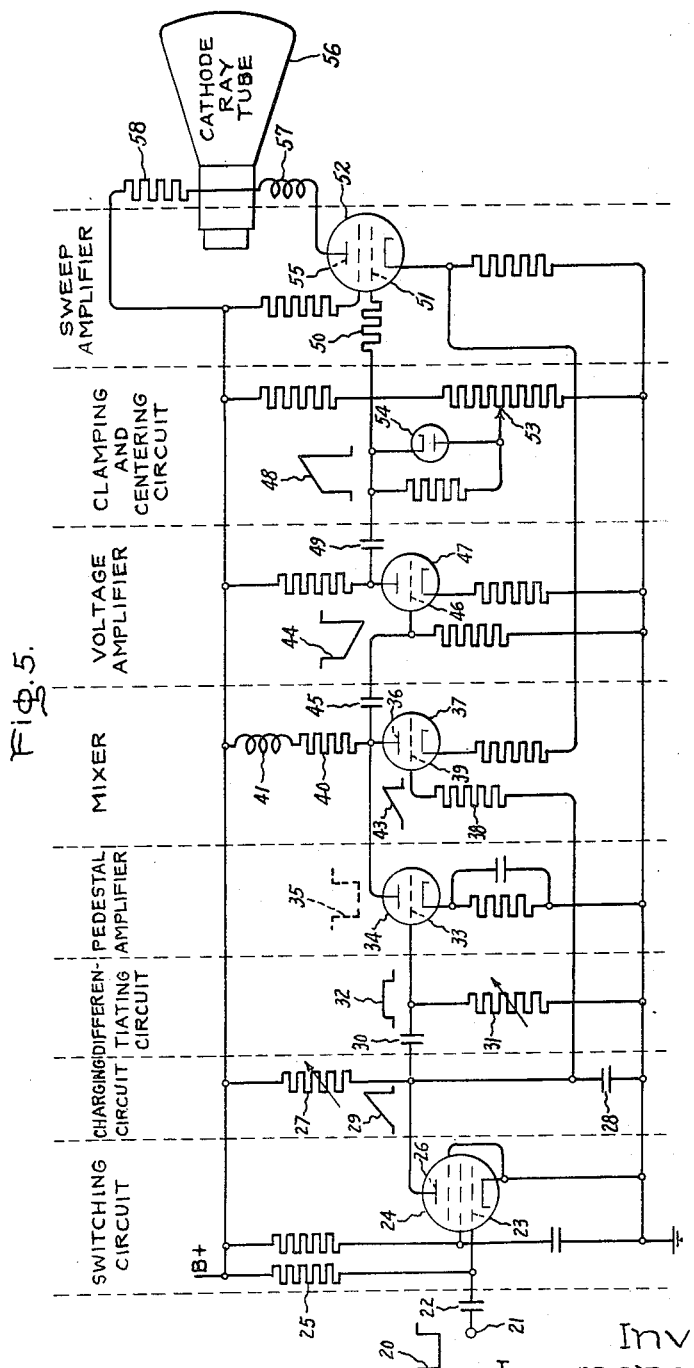

Patented Nov. 17, 1953

2,659,837

UNITED STATES PATENT OFFICE 2,659,837

SWEEP LINEARITY CONTROL CIRCUIT

Lawrence C. Murdock, Liverpool, N. Y., assignor to General Electric Company, a corporation of New York Application March 29, 1949, Serial No. 84,192

8 Claims. (Cl. 315—27)

This invention relates generally to circuits for generating sweep voltages, and more particularly to a circuit for providing linear sweep voltages of variable speed, suitable for use with a cathode ray tube utilizing electromagnetic deflection.

It is a well known fact that the bending or deflection of an electron beam, in a direction orthogonal to a magnetic field, is proportional to the intensity of the field. Accordingly, where the field is created by passing an electric current through a coil, if the beam is to be deflected at a constant rate, then the current through the coil must also vary at a constant rate. In other words, it is necessary to provide a current through the deflection coil which varies linearly with time.

Considering a theoretical deflection coil containing only inductance, a linearly rising current could be obtained through such a coil by applying a step or pedestal voltage to its terminals. However, since any actual coil has a certain finite resistance, a step voltage applied to a coil cannot produce a linearly rising current, because the resistance will eventually limit the current to a constant value. Accordingly, a sloping or rising component must be superimposed on the step voltage to compensate for this effect.

Since the sweep voltage applied to the deflecting coil for producing a linearly rising current must contain two components, it follows that if the rate of sweep is to be varied, each component must normally be adjusted independently. For this reason, sweep generators commonly utilized in the art heretofore have required the adjustment of two separate controls for providing different sweep rates.

It is an object of my invention to provide a sweep voltage generating circuit for an electromagnetic deflection system in which different sweep rates may be obtained through an adjustment of a single control.

Another object of my invention is to provide a sweep circuit for an electromagnetic deflection system in which the sweep voltage contains two components, one corresponding to the inductance, and the other, to the resistance of deflecting coil, and in which a variation in one of the components causes a compensating variation in the other component to follow automatically.

For further objects and advantages and for a better understanding of the invention, attention is now directed to the following description and accompanying drawings, and also to the appended claims, in which the features of the invention believed to be novel are more particularly pointed out.

In the drawings:

Fig. 1 is a pictorial representation of a cathode ray tube utilizing electromagnetic deflection, along with an equivalent circuit illustrating the impedance characteristics of a deflection coil.

Figs. 2a, and 2b, and 2c, contain curves, drawn to identical time scales, illustrating the voltage and current relationships required to produce different sweep rates in the cathode ray tube of Fig. 1.

Fig. 3 is a schematic diagram of a simplified sweep generator circuit, along with certain curves illustrating its operating characteristics.

Fig. 4 is a circuit diagram of a differentiating circuit along with certain curves illustrating its operating characteristics.

Fig. 5 is a schematic diagram of a circuit for generating sweep voltages for a cathode ray tube utilizing electromagnetic deflection, and incorporating an automatic compensation feature in accordance with my invention.

Referring now to Fig. 1, there is shown a cathode ray tube 1, of the electromagnetic deflection type. Deflection of the electron beam in the tube is produced by passing a current through the coils 2 and 3, thereby causing the beam to describe a luminous trace 4, on the fluorescent end wall of the tube. The electrical characteristics of the coils 2 and 3 are represented by the circuit 5 which contains an equivalent resistance R and inductance L in series.

Referring to Fig. 2a, the curve $i$ illustrates the current which must flow through the deflecting coils to produce a linear sweep in tube 1 or, in other words, to cause the light spot on the end wall of the tube to displace itself at a linear rate with respect to time. Since the voltage produced across an inductance due to a current flowing therein is proportional to the rate of change of current, conversely it follows that the application of a step voltage to an inductance will cause a linearly rising current. Also, since the voltage produced across a resistance by a linearly rising current rises linearly, it follows that a sloping component must be added to the step voltage to compensate for the effect of the resistance component in the deflecting coil. These two components are illustrated by curve $e$ of Fig. 2a, wherein the amplitude of the voltage $e$ at a time $t_4$ is the resultant of two components $E_1$ and $E_2$. The component $E_1$ is that corresponding to the resistance of the deflecting coil, and the component $E_2$ is that corresponding to its inductance. It will doubtless be apparent that the particular waveform shown will assure a linearly rising current through a deflecting coil having a certain ratio of resistance to inductance, but not through any other. If this ratio is changed, the relative amplitudes of the components of $E_1$ and $E_2$ must be changed proportionally.

Referring to Fig. 2b, the curve $i$ therein illustrates the variation in current with respect to time which must be produced to provide a sweep at twice the speed of that shown in Fig. 2a. In this case, the current must rise linearly from zero to its peak amplitude during the time interval $t_0$ to $t_2$. Curve $e$ now comprises a component $E_1$ of the same magnitude as before, only rising in half the time, and a component $E_2$ of twice the amplitude of that shown in Fig. 2a.

Referring to Fig. 2c, the curves $i$ and $e$ therein illustrate the current and voltage conditions for a sweep of four times the rate of that shown in Fig. 2a. The component $E_1$ is of the same amplitude as shown in Fig. 2a but rises in one quarter of the time interval, and the component $E_2$ has four times the amplitude of the same component in Fig. 2a.

The curves of Fig. 2 thus illustrate the general principle that in an electromagnetic deflecting system utilizing coils having both resistance and inductance, the magnitude of the step voltage corresponding to the inductance of the coil must vary directly as the rate of sweep, and the slope of the rising component corresponding to the resistance of the coil must also vary directly as the rate of sweep. Stated in other words, both the amplitude of the step component and the slope of the rising component must vary directly as the rate of sweep, or inversely as the period of the sweep.

Referring to Fig. 3, there is shown a sweep voltage generating circuit comprising an electron discharge device 6, having an anode 7, a cathode 8, and a control electrode 9. The charging circuit comprises a resistance $R_1$, a capacitance $C_1$ and a second resistance $R_2$, all connected in series between a source of positive potential indicated by B+ and ground. The anode 7 of device 6 is connected to the junction of the resistance $R_1$ and $C_1$. Previous to the generation of a sweep voltage, device 6 is conducting heavily, so that the potential across $C_1$ and $R_2$ is practically zero. When a negative gate voltage, such as is illustrated by curve 10, is applied to electrode 9, device 6 is cut off and becomes non-conducting, so that capacitance $C_1$ charges and a voltage is produced across resistance $R_2$ as a result of the charging current.

The voltage produced at the output terminal 11 is the resultant of the charge accumulating across $C_1$ and of the voltage produced across $R_2$ due to the charging current. This is shown by curve 12, illustrating the two components, $E_1$ resulting from the charging of capacitor $C_1$, and $E_2$, resulting from the current through resistance $R_2$.

The magnitudes of the components $E_1$ and $E_2$ at time $t$ are given by the following equations:

$$E_1 = (B+)\left(1 - \epsilon^{\frac{-t}{(R_1+R_2)C_1}}\right) \qquad (I)$$

$$E_2 = (B+) \cdot \frac{R_2}{R_1+R_2} \qquad (II)$$

The conditions under which the rate of sweep may be varied and linearity maintained become apparent upon inspection of Equations I and II above. Thus, increasing the magnitude of the operating voltage B+ changes the slope of $E_1$ and the magnitude of $E_2$ at the same rate. This would insure linearity in the sweep voltage for different rates of sweep. However, it is not a practical method because in electronic apparatus, the operating potentials are normally maintained constant inasmuch as possible. The other terms which enter Equation I and II may also be varied, that is, $R_1$, $C_1$, and $C_2$ may be varied. However, in such case, it is always necessary to vary at least two components, in order to maintain linearity.

Referring to Fig. 2, it will be noted that the amplitude of the step or pedestal portion of the sweep voltage must be proportional to the slope of the current, and that likewise, the slope of the rising portion must also be proportional to the slope of the current. In accordance with my invention, a charging circuit is provided to generate a linearly rising voltage whose slope is proportional to that of the desired current. A differentiating circuit is provided to operate on this linearly rising voltage and to produce therefrom, a step or pedestal component whose amplitude is proportional to the slope. Thereafter the rising voltage and the pedestal component are combined in a mixing circuit to provide the required sweep voltage.

The operation of a simple electrical differentiating circuit is shown in Fig. 4, wherein an input voltage $E_i$ is supplied at a pair of terminals across which a capacitance $C_3$ and a resistance $R_3$ are connected in series. The output voltage $E_o$ is produced across the resistance $R_3$. The curves 13 and 14 illustrate two different values of a linearly rising voltage $E_i$ applied to the input terminals, and the curves 15 and 16 illustrate the corresponding values of output voltage $E_o$. The following equations give the magnitude of the voltages $E_i$ and $E_o$, at a time $t$, wherein $k$ represents the rate of rise of the voltage $E_i$ in volts per unit of time.

$$E_i = k.t, \qquad III$$

$$E_o = k.R_3C_3\left(1 - \epsilon^{\frac{-t}{R_3C_3}}\right) \qquad IV$$

and $$E_o \approx k.R_3C_3, \text{ where } R_3C_3 \text{ is small.} \qquad V$$

Equation V shows that where the product $R_3 C_3$ is made sufficiently small, the second term of the equation tends to zero, and the output voltage $E_o$ tends to a constant amplitude of $k.R_3 C_3$.

Referring to Fig. 5, there is shown a sweep generating circuit constructed in accordance with principles already described, which incorporates an automatic compensation feature for maintaining sweep linearity with varying sweep rates. Typical voltage waveforms have been illustrated in proximity to the circuit component wherein they occur. The different parts of the circuit and their functions will henceforth be described simultaneously in order to facilitate the understanding thereof.

The generation of a sweep voltage is initiated by the application of a negative gate voltage, illustrated by curve 20, to a terminal 21. This voltage is coupled through a capacitor 22, to the control electrode 23 of an electron discharge device 24. Device 24 constitutes a switching circuit and is normally in a highly conducting state, due to the connection of its control electrode, through a resistor 25, to a source of operating potential indicated by B+.

The anode 26 of device 24 is connected to the junction of a variable resistor 27 and a capacitor 28, serially connected between B+ and ground. Resistor 27 and capacitor 28 constitute a charging circuit. The voltage across capacitor 28 is normally quite low because device 24, in its conducting state, behaves as a short circuit across it. When device 24 is cut off, capacitor 28 charges due to the current flowing through resistor 27 and a sawtooth or linearly rising voltage is generated across it, as illustrated by curve 29.

A differentiating circuit, constituted by a capacitor 30 and a variable resistor 31, is connected across capacitor 27. This differentiating circuit has a relatively short time-constant, so that the voltage produced across resistor 31 is a pedestal or step voltage, as illustrated by curve 32. The amplitude of the pedestal is proportional to the slope of the rising voltage illustrated by curve 29.

The junction of capacitor 30 and resistor 31 is connected to the control electrode 33 of an electron discharge device 34, operating as a pedestal amplifier. The pedestal or step-voltage 32 is amplified through device 34, and tends to appear at its anode as an inverted step or pedestal, as illustrated by the dotted curve 35. However, the voltage at the anode of device 34 is dependant upon the voltage generated in device 37, and the pedestal illustrated by curve 35, is actually a component of the final output voltage of both devices illustrated by curve 44. The purpose of the pedestal amplifier is to increase the amplitude of the pedestal component so as to make it of the proper relative magnitude compared to the rising or sawtooth voltage illustrated by curve 29.

The anode of device 34 is connected to the anode 36 of an electron discharge device 37 operating as a mixer. The sawtooth or rising voltage generated across capacitor 28 is coupled through a resistor 38 to the control electrode 39 of device 37. Anode 36 is connected to the source of operating potential B+ through a resistor 40 and a peaking inductance 41 in series. The purpose of inductance 41 is to sharpen the leading edge of the sweep voltage so as to give it a high rate of rise. The input to control electrode 39 is illustrated by curve 43 and the output voltage at the anode is the resultant of the addition of curve 43, reversed in phase, to curve 35, and is illustrated by curve 44.

The output voltage of the mixer is coupled through a capacitor 45 to the control electrode 46 of an electron discharge device 47 operating as a voltage amplifier. The output of device 47 is a voltage of the desired phase and waveform, illustrated by curve 48, and this voltage is coupled through a capacitor 49 and a series resistor 50 to the control electrode 51 of an electron discharge device 52 operating as sweep amplifier.

The average operating potential at control electrode 51 is determined by the setting of a potentiometer 53. A diode 54 operates as a clamping circuit or D. C. restorer to maintain the reference voltage at electrode 51 in accordance with this setting, in spite of changes in waveform 48 due to variations in sweep rate. The anode 55 of device 52 is connected, in series with the deflecting coils of a cathode ray tube 56, to the source of operating potential B+. The deflecting coils are represented by an inductance 57 and a resistance 58 in series.

The rate of sweep or amplitude of the deflecting voltage is determined by the setting of variable resistor 27. Thus decreasing the magnitude of resistor 27 increases the rate of charge of capacitor 28, and results in a faster sweep at the cathode ray tube. The relative magnitude of the step or pedestal portion of the sweep voltage is fixed once and for all by the setting of resistor 31. Resistor 31 is adjusted, not with regards to the particular rate of sweep, but with regards to the ratio of inductance to resistance in the deflecting coils of the cathode ray tube. Thereafter the rate of sweep may be changed by varying resistor 27, and the ratio of the rising portion of the pedestal portion of the sweep voltage remains unchanged.

The circuit which I have illustrated in this embodiment of my invention requires the adjustment of only one component, namely variable resistor 27, to provide a change in the sweep rate. This is a distinct improvement over conventional systems wherein at least two components, a rate control and a linearity control, must be individually adjusted to change the sweep rate. In accordance with my invention, the linearity is maintained in spite of variations in either the time duration of the gate voltage, or the rate of sweep, and hence an automatic linearity control is provided.

While a specific embodiment has been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. A circuit for generating a voltage wherein the amplitude of a pedestal component and the slope of a rising component are maintained in a fixed ratio when the amplitude of said voltage is varied, comprising means for generating a rising voltage component of given slope, means for differentiating said given slope component to obtain a pedestal voltage component having an amplitude proportional to said given slope, and a mixing circuit for combining said voltage components to provide said desired voltage.

2. In combination, a charging circuit for producing a voltage having a linear rate of rise with time, said circuit being adjustable to vary said rate, a differentiating circuit responsive to said produced voltage for producing a pedestal voltage having an amplitude proportional to said rate, a mixing circuit for additively combining said produced voltages, thereby producing an output voltage having a rising component with said rate of rise and a pedestal component with an amplitude proportional to said rate.

3. In combination, a recurring sawtooth voltage generator having a control for varying the rate of rise of said sawtooth, a differentiating circuit having a short time-constant with respect to a period of said sawtooth, said differentiating circuit being connected to said generator for producing in response to said sawtooth voltage a pedestal voltage having an amplitude proportional to the rate of rise of said sawtooth voltage, a mixer circuit comprising an electronic discharge device having an output terminal, and connections from said generator and from said differentiating circuit for supplying said sawtooth and pedestal voltages to said discharge device whereby a voltage having a sawtooth component with said rate of rise, and a pedestal component of an amplitude proportional to said rate of rise is produced ta said output terminal.

4. An apparatus for producing a linearly rising current through a network containing resistance and inductance and including a single control for varying said rate of rise, comprising a periodic sawtooth voltage generator having an adjustable element for varying the rate of rise of said sawtooth, a differentiating circuit having a short time-constant with respect to a period of said sawtooth, said differentiating circuit being connected to said generator and responsive to said sawtooth voltage to produce a pedestal voltage having an amplitude proportional to the rate of rise of said sawtooth, an amplifier for increasing the amplitude of said pedestal with respect to said sawtooth voltage to a level corresponding to the ratio of inductance to resistance in said network, a mixer circuit comprising an electronic discharge device having an input and an output electrode, a source of unidirectional potential, means for energizing the electron discharge path of said device comprising an output load circuit coupling said output electrode to said unidirectional potential source, and connections from said generator and from said amplifier to said input and output electrodes respectively whereby a voltage having a sawtooth component and a pedestal component for providing a linearly rising current through said network is produced at said output electrode, said adjustable element providing said single control for varying the rate of rise of said current.

5. A linear periodic sweep current generator for a cathode ray tube utilizing an electromagnetic deflection coil, comprising a charging network including a resistance and a capacitance connected in series across a unidirectional potential source, and a discharge tube connected across said capacitance, means for periodically energizing said discharge tube to produce a linearly rising sawtooth voltage across said capacitance, a differentiating circuit having a short time-constant with respect to a period of said sawtooth, said differentiating circuit being connected across said capacitance and responsive to said sawtooth voltage to produce a pedestal voltage having an amplitude proportional to the rate of rise of said sawtooth, an amplifier for increasing the amplitude of said pedestal to a level corresponding to the ratio of inductance to resistance in said deflection coil, a mixer circuit comprising an electronic discharge device having an input electrode and an output electrode, connections from said capacitance and from said amplifier to said input and output electrodes respectively whereby a voltage having a sawtooth component and a pedestal component for providing a linearly rising current through said deflection coil is produced at said output electrode, and a single control in said network for varying the rate of rise of said sawtooth, whereupon the amplitude of said pedestal varies automatically to maintain the linearity of said sweep current through said coil.

6. A sweep voltage generator comprising means for generating a voltage varying with time at an adjustable linear rate for a given time duration, means for generating a square wave voltage having an amplitude proportional to the rate of change of said first-named generated voltage and of said given duration, and means for algebraically combining said generated voltages to provide a resultant sweep voltage.

7. An arrangement for producing a current wave having an adjustable slope between two current limits in an inductive circuit having resistance comprising means for generating a first voltage wave having an adjustable slope corresponding to the slope of said desired current wave, means for differentiating said generated voltage wave with respect to time, and means for adding said generated and differentiated voltage waves before application to said inductive circuit.

8. A sweep current generator comprising means for generating a voltage of given duration having an adjustable finite linear slope, means for generating a substantially square wave voltage having an amplitude variable in accordance with the slope adjustment of said generated voltage and of said given duration, and means for adding said generated voltages with the same polarity to provide a resultant sweep voltage, and an inductive circuit having resistance responsive to said added voltages for producing said sweep current.

LAWRENCE C. MURDOCK.

References Cited in the file of this patent

UNITED STATES PATENTS

| Number | Name | Date |
| --- | --- | --- |
| 2,059,219 | Farnsworth et al. | Nov. 3, 1936 |
| 2,110,245 | Stocker | Mar. 8, 1938 |
| 2,144,351 | Vance | Jan. 17, 1939 |
| 2,438,910 | Grieg | Apr. 6, 1948 |
| 2,506,770 | Braden | May 9, 1950 |
| 2,556,179 | Grieg et al. | June 12, 1951 |